United States Patent [19]

Pariser

[11] 3,915,634
[45] Oct. 28, 1975

[54] DYEING PROCESS
[75] Inventor: Albert A. Pariser, Clifton, N.J.
[73] Assignee: Pariser Industries, Clifton, N.J.
[22] Filed: June 24, 1974
[21] Appl. No.: 482,749

Related U.S. Application Data

[63] Continuation-in-part of Ser. No. 353,963, April 24, 1973, abandoned, Continuation-in-part of Ser. No. 172,346, July 26, 1971, abandoned.

[52] U.S. Cl. ............... 8/169; 8/89; 8/170; 8/171; 8/173
[51] Int. Cl.$^2$ ............ C09B 67/00; D06P 5/04
[58] Field of Search ......... 8/169, 173, 174, 93, 171, 8/89, 170

[56] References Cited
UNITED STATES PATENTS

| | | | |
|---|---|---|---|
| 2,828,180 | 3/1958 | Sertorio | 8/62 |
| 3,179,483 | 5/1965 | Millson et al. | 8/21 |
| 3,334,960 | 8/1967 | Abel | 8/54 |
| 3,473,175 | 10/1969 | Sieber | 8/158 |
| 3,523,749 | 8/1970 | MacLeod et al. | 8/94 |
| 3,740,345 | 6/1973 | Berger | 8/171 |

FOREIGN PATENTS OR APPLICATIONS

| | | | |
|---|---|---|---|
| 1,180,142 | 2/1970 | United Kingdom | 8/171 |

*Primary Examiner*—Melvyn I. Marquis
*Assistant Examiner*—H. H. Fletcher
*Attorney, Agent, or Firm*—Bierman & Bierman

[57] ABSTRACT

A stable, water in oil, dyeing emulsion comprising a water-soluble or water-dispersible dye; water; an effective amount of an additive comprising a coconut-fatty acid-diethanol amine condensate, nonylphenol-poly(ethyleneoxy)ethanol, and a surfactant comprising mono and di esters of phosphoric acid and nonyl phenol, the nonyl phenol being ethoxylated with an average of about 4 to 9 moles of ethylene oxide; and an amount of a solvent taken from the class consisting of perchlorethylene and trichlorethylene preferably less than the amount of said water. Methods of preparing this emulsion are also disclosed, as well as methods of dyeing certain substances using the emulsion.

27 Claims, No Drawings

DYEING PROCESS

This application is a continuation-in-part of copending Ser. No. 353,963, filed Apr. 24, 1973 which is a continuation-in-part of Ser. No. 172,346, filed July 26, 1971, both now abandoned.

The present invention relates to an improved method of preparing emulsions suitable for use in immersion dyeing of certain materials as well as a method of immersion dyeing using such emulsions. In particular, this invention is especially useful in the dyeing of wool, cellulosic materials and polyamides. The method is suitable for use in connection with cloth fiber or yarn.

The first part of the present invention consists of the special emulsions and the methods of making them which render the dyeing process possible. In the past, dyeing has been carried on in an emulsion system, but it has been necessary to constantly mix the water and oil mixture in order to prevent separation thereof. The machines used for such processes required the presence of a milling device through which the liquid would constantly circulate. The emulsion would exit from the mill at one point and would then immediately begin to separate, thus constant circulation and re-emulsification were a necessity.

The emulsions of the present invention on the other hand, are sufficiently stable for the normal dyeing times so that no milling is required, In fact, it is not even necessary to mill in order to form the emulsion. Simple stirring or agitation will suffice.

In preparing the emulsions of the present invention, an additive is prepared by mixing 0.5 – 3% by volume of a coconut-fatty acid-diethanol amine condensate; 1 – 10% by volume of a nonylphenolpoly(ethyleneoxy)ethanol having a free acid group; 87 – 98.5% by volume of a surfactant comprising mono and di esters of phosphoric acid and nonyl phenol, said nonyl phenol ethoxylated with an average of about 4–9 moles of ethylene oxide (hereinafter referred to as phosphated surfactant). Preferably the esters contain an average of about 6 to 8 moles of ethylene oxide, and most preferably an average of about 7 moles of ethylene oxide, per mole of nonyl phenol. The esters may have substantial amounts of free ethoxylated nonyl phenol present. This additive is further mixed with 0.8 to 1.2 parts of solvent per part of additive by volume.

A suitable surfactant is GAFAC PE 510 (manufactured and sold by GAF Inc.). This material has an average of approximately 7 moles moles of ethylene oxide per mole of nonyl phenol. It is prepared by reacting $P_2O_5$ with ethoxylated nonyl phenol. The product contains approximately 20 to 45% secondary phosphate ester, 30 to 80% primary ester, and 0 to 40% nonyl phenol, by weight.

A water-soluble or water-dispersible dye, which is acid or neutral in character, is dissolved or dispersed in enough water to wet the substance to be dyed. This dye-water mixture is combined with the additive-solvent mixture to form a first solution. The amount of dye is by no means critical, but usually falls between 0.1 and 6% by weight based on the material to be dyed.

The first solution is then mixed with at least an equal volume of the solvent to form the dyeing emulsion. Sufficient emulsion is used in the dyeing process so that there is at least 0.5% of the additive based upon the weight of the material being dyed.

It has been found helpful to introduce the dye into the water at elevated temperatures to improve solubility characteristics. The preferred ratio of solvent to the water present is between 13 and 17:1.

As an alternative method of producing the emulsion, it is possible to mix the additive with all of the solvent and add to that mixture the mixture of dye and water. It has been found that emulsions suitable for dyeing require that the aqueous phase be added to the oil phase rather than the reverse.

The method of dyeing according to the present invention comprises basically the use of the aforedescribed emulsion under normal dyeing conditions with certain exceptions and limitations which have been found to be important to the production of a good even dyeing coupled with maximum economy and efficiency in the use of the dyeing materials. In practicing the dyeing method, there is provided a vessel having sufficient capacity to contain therein the solvents referred to herein and the substances being dyed. The vessel can be a cylinder or drum of the usual type. The machine is preferably provided with a circulating means in order to insure maximum contact between the dye and the substance being dyed. No milling circuit is required, but the presence of one in no way interferes with the operation of the method. Such a circuit would of course fulfill the dual function of circulation as well as milling.

The previously-described emulsion is charged into the vessel. There should be present sufficient water in the emulsion to both wet the fabric and dissolve the dye. The former is of utmost importance, while the latter is not critical. Clearly, if there is insufficient water to dissolve all of the desired dye, the method will still work but the color will be lighter than originally intended. However, if there is insufficient water to wet the substance being dyed, then blotching or other unsatisfactory results will be obtained.

The present method is intended for the dyeing of wool, cellulosic materials, and polyamides only and is not intended for such materials as polyesters.

It is desirable in this process to maintain the amount of water as low as possible. It is the use of a small amount of water which is a major contributing factor to the virtually complete exhaustion of the dye from the water phase. To obtain maximum use of the dye, there should not be more water than is necessary to both wet the fabric and dissolve the dye. In this way, the dye is in a comparatively concentrated form and the amount left in the water phase is kept to a minimum. Since the dyes used are water soluble or water dispersible, they remain in the aqueous phase. Thus, the amount of solvent present can be varied over an extremely wide range without adversely affecting the process.

The pH should be maintained below 7.0 and preferably 4.0. The most desirable range has been found to be from 4.0 to 6.0. There should be between 10 and 20 pounds of water per pound of substance to be dyed and the most preferable range is from 13 to 17 pounds of water per pound of substance to be dyed.

Insofar as the temperature is concerned, it can vary over a wide range. However, there are certain necessary and critical considerations. This dyeing process acts by an ionic interchange between various chemical groups on the fibers and complementary groups on the dyes themselves. It is for this reason that acid dyestuffs are employed for wool and polyamide dyes and direct dyes are employed for cellulosics. There is a minimum temperature below which the reaction desired will not take place. Necessarily this temperature varies with the particular combinations of dyes and fibers. For purposes of this specification and claims, this minimum temperature is called the strike point.

The strike point can be determined by introducing the material to be dyed into the particular bath being used in a beaker and gradually heating with some agitation. The strike point is the lowest temperature at which exhaustion of the dye from the aqueous phase of the emulsion can be visually observed. It has been found that the strike point is generally between 140° and 160°F; however with certain dyes it may be lower, i.e. as low as 120°F.

When a bath falling within the foregoing parameters has been introduced into the vessel, the substance to be dyed is also placed therein. The temperature is then increased to the strike point or above, and maintained until the dye is exhausted. The exhaustion point can be determined visually. so long as the temperature is below the strike point no dyeing will occur and there is no criticality about the order of addition as between the emulsion and the substance.

After the dye is exhausted, the bath is then discharged, preferably to a still for solvent recovery. The cloth is rinsed with solvent and in a preferred form of the invention a neutralizing agent is included in the last rinse. The rinse liquid is also discharged to the still for solvent recovery. After rinsing is complete, the goods are dried by, for example, the use of warm air.

An alternative recovery consists in the use of a decanter. Since the solvents are immiscible with water and have higher specific gravities than water, recovery can be accomplished by use of steam or by use of specific gravity differential. The solvents will, due to their higher specific gravity, sink to the bottom of the decanter where they can be drained off in substantially pure form for reuse in the next batch.

In order to more specifically illustrate the present invention, the following examples are presented. They are intended to be illustrative only and not to constitute a limitation in any way on the invention.

EXAMPLE 1

Emulsion preparation: 0.03 cc of a coconut fatty acid diethanolamine condensate, 0.15 cc of a nonylphenolpoly(ethyleneoxy)ethanol, and 2.82 cc of phosphated surfactant (GAFAC PE 510 from GAF, Inc.), are mixed together. This mixture is further mixed with an equal volume of perchlorethylene. The additive perchlorethylene mixture is then mixed with a solution of 0.1 g of Acid Blue 25 dye in 150 cc of water to form a first solution. The first solution is then added to 300–350 cc of perchlorethylene and agitated to form a smooth stable emulsion. This amount of emulsion was suitable for dyeing 10 grams of fabric fiber or yarn.

EXAMPLE 2

Method of dyeing: 1 lb. of nonylphenolpoly(ethyleneoxy)ethanol, 5 lbs. of phosphated surfactant as described in Example 1 and 0.2 lbs. of coconut fatty acid diethanolamine are mixed together and added to an equal volume of perchlorethylene. To the resultant blend is added 20 gals. of water containing 0.4 lbs. of Acid Blue 25 dye. This combination is then charged into the cylinder of a dry cleaning machine which contains 60 gals. of perchlorethylene. The combination is agitated to form the desired emulsion. In order to facilitate the solution of dye into the water, the temperature thereof is raised to approximately 160°F. After addition to the dry cleaning machine and formation of the emulsion, the entire bath is cooled to below 80°C. and preferably to about 75°. 80 lbs. of nylon cloth were added to the bath and the bath was agitated for about 1 minute. The temperature was then raised to 140°F. and agitation continued throughout the dyeing cycle. The pH was maintained on the acid side and the cycle was continued until visual observation indicated that the dye had been exhausted. In this case, the end point was reached in about 6 to 8 minutes. The resulting dyed fabric was smooth and satisfactory in all respects. Virtually no dye was left in the emulsion and therefore the efficiency was extremely high.

The spent bath is discharged to a still where the solvent and water mixture are distilled off, condensed and separated by decantation. The water is discharged to waste and the solvent is returned to the process.

The cloth was rinsed twice with 40 gals. of perchlorethylene each time. A neutralizing agent was added to the second rinse. In each case, the rinse liquid was discharged to the still for separation and reuse. After the last rinse was completed, the cloth was dried in a stream of hot air at 160°F.

EXAMPLE 3

Method of dyeing: 1 lb. of nonylphenolpoly(ethyleneoxy)ethanol, 5 lbs. of the phosphated surfactant as described in Example 1 and 0.2 lbs. of coconut fatty acid diethanolamine are mixed together and added to an equal volume of perchlorethylene. To the resultant blend is added 20 gals. of water containing 0.4 lbs. of Acid Yelllow 40 dye. This combination is then charged into the cylinder of a dry cleaning machine which contains 60 gals. of perchlorethylene. The combination is agitated to form the desired emulsion. In order to facilitate the solution of dye into the water, the temperature thereof is raised to approximately 160°. After addition to the dry cleaning machine and formation of the emulsion, the entire bath is cooled to below 80°F. and preferably to about 75°. 80 lbs. of nylon cloth were added to the bath and the bath was agitated for about 1 minute. The temperature was then raised to 120°F. and agitation continued throughout the dyeing cycle. The pH was maintained on the acid side and the cycle was continued until visual observation indicated that the dye had been exhausted. In this case, the end point was reached in about six to eight minutes. The resulting dyed fabric was smooth and satisfactory in all respects. Virtually no dye was left in the emulsion and therefore the efficiency was extremely high.

The spent bath is discharged to a still where the solvent and water mixture are distilled off, condensed and separated by decantation. The water is discharged to waste and the solvent is returned to the process.

The cloth was rinsed twice with 40 gals. of perchlorethylene each time. A neutralizing agent was added to the second rinse. In each case, the rinse liquid was discharged to the still for separation and reuse. After the last rinse was completed, the cloth was dried in a stream of hot air at 160°F.

As can be seen from the foregoing, it is possible by the process of the present invention to carry out smooth and effective dyeings at much lower temperatures than had been heretofore thought possible. The prior art customarily dyed nylons at approximately 205°F. and cellulosic materials and wools were dyed at approximately the boiling point. The low temperature dyeing which the present invention is able to carry out means that there is less shrinkage, better tensile strength in the fiber, less tendency towards erosion and corrosion of the equipment, as well as reduced vapor formation. In this manner, the waste liquids contain fewer toxic or deleterious substances and therefore pollution of the environment is minimized. The economy in using virtually all of the dye is of course of great importance as the dyestuff itself is far and away the single most expensive material being used.

As can be seen from the foregoing description, the present invention represents a substantial advance in the art of immersion dyeing and as such is to be broadly construed and not to be limited except by the character of the claims appended hereto.

What is claimed:

1. A method of making a stable, water in oil emulsion suitable for dyeing a substance taken from the class consisting of wool, cellulosic material and polyamides, comprising dissolving or dispersing a water-soluble or water-dispersible acid or neutral dye in water containing an effective amount of
   a. an additive comprising 0.5 to 3% of a coconut fatty acid-diethanol amine condensate; 1 to 10% of a nonylphenolpoly(ethyleneoxy)ethanol; and 87–98.5% of surfactant comprising mono and di esters of phosphoric acid and nonyl phenol, said nonyl phenol ethoxylated with an average about 4–9 moles of ethylene oxide per mole of nonyl phenol; all percentages being by volume, and
   b. a solvent taken from the class consisting of perchlorethylene and trichlorethylene, there being 0.8 – 1.2 parts of said solvent to 1 part of said additive by volume, to form a first solution,
then mixing said first solution with an additional amount of said solvent, there being present 0.1 – 6% by weight of said dye based on said substance and at least 0.5% of said additive based on the weight of said substance, there being more of said solvent than said water in said emulsion.

2. A method of making a stable, water in oil emulsion suitable for dyeing a substance taken from the class consisting of wool, cellulosic material and polyamides, comprising dissolving or dispersing a water-soluble or water-dispersible acid or neutral dye in water to form a first solution, mixing a solvent taken from the class consisting of perchlorethylene and trichlorethylene with an effective amount of
   an additive comprising 0.5 to 3% of a coconut fatty acid-diethanol amine condensate; 1 to 10% of a nonylphenolpoly(ethyleneoxy)ethanol; and 87–98.5% of a surfactant comprising mono and di esters of phosphoric acid and nonyl phenol, said nonyl phenol ethoxylated with an average of about 4–9 moles of ethylene oxide per mole of nonyl phenol; all percentages being by volume
to form a second solution, there being 0.1 to 6% by weight of said dye based on said substance, mixing said first solution with said second solution, there being at least 0.5% by weight of said additive based on said substance and more of said solvent than said water in said emulsion.

3. A method according to claim 1 wherein said surfactant has an average of about 6 to 8 moles of ethylene oxide per mole of nonyl phenol.

4. A method according to claim 1 wherein said surfactant has an average of about 7 moles of ethylene oxide per mole of nonyl phenol.

5. A method according to claim 2 wherein said surfactant has an average of about 6 to 8 moles of ethylene oxide per mole of nonyl phenol.

6. A method according to claim 2 wherein said surfactant has an average of about 7 moles of ethylene oxide per mole of nonyl phenol.

7. A method of dyeing a substance taken from the class consisting of wool, cellulosic material and polyamides comprising immersing the substance in a bath comprising the emulsion of claim 1, there being enough of said water to dissolve said dye and wet said substance, maintaining the pH of said emulsion below 7.0 and the temperature of said bath above the strike point.

8. A method according to claim 7 wherein said temperature is 120°–160°F.

9. A method according to claim 7 wherein there is about 10–20 pounds of said water per pound of said substance.

10. A method according to claim 7 wherein there is about 13–17 pounds of said water per pound of said substance.

11. A method according to claim 7 wherein said pH is at least 4.

12. A method according to claim 7 wherein said pH is 4 to 6.

13. A method of dyeing a substance taken from the class consisting of wool, cellulosic material and polyamides comprising immersing the substance in a bath comprising the emulsion of claim 2, there being enough of said water to dissolve said dye and wet said substance, maintaining the pH of said emulsion below 7.0 and the temperature of said bath above the strike point.

14. A method according to claim 13 wherein said temperature is 120°–160°F.

15. A method according to claim 13 wherein there is about 10–20 pounds of water per pound of said substance.

16. A method according to claim 13 wherein there is about 13–17 pounds of said water per pound of said substance.

17. A method according to claim 13 wherein said pH is at least 4.

18. A method according to claim 13 wherein said pH is 4 to 6.

19. A stable, water in oil, dyeing emulsion comprising a water-soluble or water-dispersible dye; water; an effective amount of an additive comprising a coconut fatty acid-diethanol amine condensate, nonylphenolpoly(ethyleneoxy) ethanol, and a surfactant comprising mono and di esters of phosphoric acid and nonyl phenol, said nonyl phenol ethoxylated with 4 to 9 moles of ethylene oxide; and a solvent taken from the class consisting of perchlorethylene and trichlorethylene, there being more of said solvent than said water in said emulsion.

20. A method according to claim 7 wherein the bath comprises 2.7 to 3.3 parts by volume of said solvent and 0.9 to 1.1 parts by volume of said water.

21. A method according to claim 13 wherein the bath comprises 2.7 to 3.3 parts by volume of said solvent and 0.9 to 1.1 parts by volume of said water.

22. A method according to claim 7 wherein said surfactant has an average of about 6 to 8 moles of ethylene oxide per mole of nonyl phenol.

23. A method according to claim 7 wherein said surfactant has an average of about 7 moles of ethylene oxide per mole of nonyl phenol.

24. A method according to claim 9 wherein said surfactant has an average of about 6 to 8 moles of ethylene oxide per mole of nonyl phenol.

25. A method according to claim 9 wherein said surfactant has an average of about 7 moles of ethylene oxide per mole of nonyl phenol.

26. An emulsion according to claim 19 wherein said surfactant has an average of about 6 to 8 moles of ethylene oxide per mole of nonyl phenol.

27. An emulsion according to claim 19 wherein said surfactant has an average of about 7 moles of ethylene oxide per mole of nonyl phenol.

* * * * *